(12) United States Patent
Llamas Maldonado et al.

(10) Patent No.: US 10,414,316 B2
(45) Date of Patent: Sep. 17, 2019

(54) CONTAINER HOLDER FOR A TRIM PANEL (71) Applicant: Ford Global Technologies, LLC, Dearborn, MI (US)

(72) Inventors: Gustavo Llamas Maldonado, Mexico City (MX); Jose Carlos Hernandez, Mexico State (MX); Jorge Araujo Nieto, Calimaya (MX)

(73) Assignee: Ford Global Technologies, LLC, Dearborn, MI (US)

( * ) Notice: Subject to any disclaimer, the term of this patent is extended or adjusted under 35 U.S.C. 154(b) by 12 days.

(21) Appl. No.: 15/633,849

(22) Filed: Jun. 27, 2017

(65) Prior Publication Data

US 2018/0370407 A1    Dec. 27, 2018

(51) Int. Cl.
*B60N 3/10* (2006.01)
*B60R 13/02* (2006.01)

(52) U.S. Cl.
CPC .............. *B60N 3/102* (2013.01); *B60N 3/10* (2013.01); *B60R 13/0243* (2013.01); *B60R 2013/0287* (2013.01)

(58) Field of Classification Search
CPC .............. B60N 3/102; B60R 13/0243; B60R 2013/0287

USPC ........................ 296/37.13, 37.8, 146.1, 146.7
See application file for complete search history.

(56) References Cited

U.S. PATENT DOCUMENTS

| | | | |
|---|---|---|---|
| 4,645,157 A * | 2/1987 | Parker | B60N 3/102 248/311.2 |
| 4,655,425 A | 4/1987 | Wallace et al. | |
| 4,756,572 A | 7/1988 | Dykstra et al. | |
| 5,072,989 A | 12/1991 | Spykerman et al. | |
| 5,618,018 A | 4/1997 | Baniak | |
| 5,860,630 A * | 1/1999 | Wildey | B60N 3/102 224/926 |
| 8,419,101 B2 * | 4/2013 | Stueber | B60N 3/102 296/24.34 |
| 9,114,839 B2 * | 8/2015 | Langenbacher | B60N 3/101 |
| 9,919,631 B2 * | 3/2018 | Huelke | B60J 5/0493 |
| 2005/0224674 A1 * | 10/2005 | Park | B60N 3/106 248/311.2 |
| 2007/0145760 A1 * | 6/2007 | Gresham | B60R 7/046 296/37.13 |

* cited by examiner

*Primary Examiner* — Jason S Morrow
*Assistant Examiner* — E Turner Hicks
(74) *Attorney, Agent, or Firm* — Vichit Chea; Price Heneveld LLP (57) ABSTRACT

A trim panel includes a container holder operably coupled to a storage area. A scuff plate is positioned below the trim panel. The scuff plate has a container receptacle.

20 Claims, 9 Drawing Sheets

CONTAINER HOLDER FOR A TRIM PANEL

FIELD OF THE DISCLOSURE

The present disclosure generally relates to a container holder. More specifically, the present disclosure relates to a container holder for a trim panel.

BACKGROUND OF THE INVENTION

Container holders are often provided at various locations within a vehicle. Some vehicles provide a container holder in a trim panel of the vehicle. However, the container holders typically provided in the trim panel of the vehicle often impede access to additional functionality of the trim panel, such as storage compartments. Further, large containers typically cannot be stored vertically in the container holder and must be placed horizontally in the storage area, thereby impeding use of the storage area. Accordingly, alternative container holder solutions are needed that do not impede access to the additional functionality of the trim panel.

SUMMARY OF THE INVENTION

According to a first aspect of the present disclosure, a trim panel includes a container holder operably coupled to a storage area. A scuff plate is positioned below the trim panel. The scuff plate includes a container receptacle.

Embodiments of the first aspect of the present disclosure can include any one or a combination of the following features:
- the container holder further includes a rotating bezel;
- the container holder is configured to hold a single container when the rotating bezel is in a stowed position and a plurality of containers when the rotating bezel is in a deployed position;
- the deployed position of the rotating bezel positions the rotating bezel directly above a wall of the container receptacle in the scuff plate;
- the rotating bezel rotates about a fixed axis in a horizontal direction as the rotating bezel is transitioned between the stowed position and the deployed position;
- the trim panel is installed in a vehicle; and
- the plurality of containers includes a first container and a second container.

According to a second aspect of the present disclosure, a trim panel includes a container holder operably coupled to a storage area. The container holder includes a rotating bezel. The container holder is configured to hold a single container when the rotating bezel is in a stowed position and a plurality of containers when the rotating bezel is in a deployed position.

Embodiments of the second aspect of the present disclosure can include any one or a combination of the following features:
- the trim panel further includes a scuff plate positioned below the trim panel, wherein the scuff plate includes a container receptacle;
- the deployed position of the rotating bezel positions the rotating bezel directly above a wall of the container receptacle in the scuff plate;
- the rotating bezel rotates about a fixed axis in a horizontal direction as the rotating bezel is transitioned between the stowed position and the deployed position;
- the rotating bezel is semi-circular in shape;
- the plurality of containers includes a first container and a second container; and
- the trim panel is a vehicle door trim panel.

According to a third aspect of the present disclosure, a trim panel includes a container holder operably coupled to a storage area. The container holder includes a rotating bezel. The container holder is configured to hold a single container when the rotating bezel is in a stowed position and a plurality of containers when the rotating bezel is in a deployed position. A scuff plate is positioned below the trim panel. The scuff plate includes a container receptacle.

Embodiments of the third aspect of the present disclosure can include any one or a combination of the following features:
- the deployed position of the rotating bezel positions the rotating bezel directly above a wall of the container receptacle in the scuff plate;
- the rotating bezel rotates about a fixed axis in a horizontal direction as the rotating bezel is transitioned between the stowed position and the deployed position;
- the rotating bezel is semi-circular in shape;
- the plurality of containers includes a first container and a second container; and
- the trim panel is a vehicle door trim panel.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
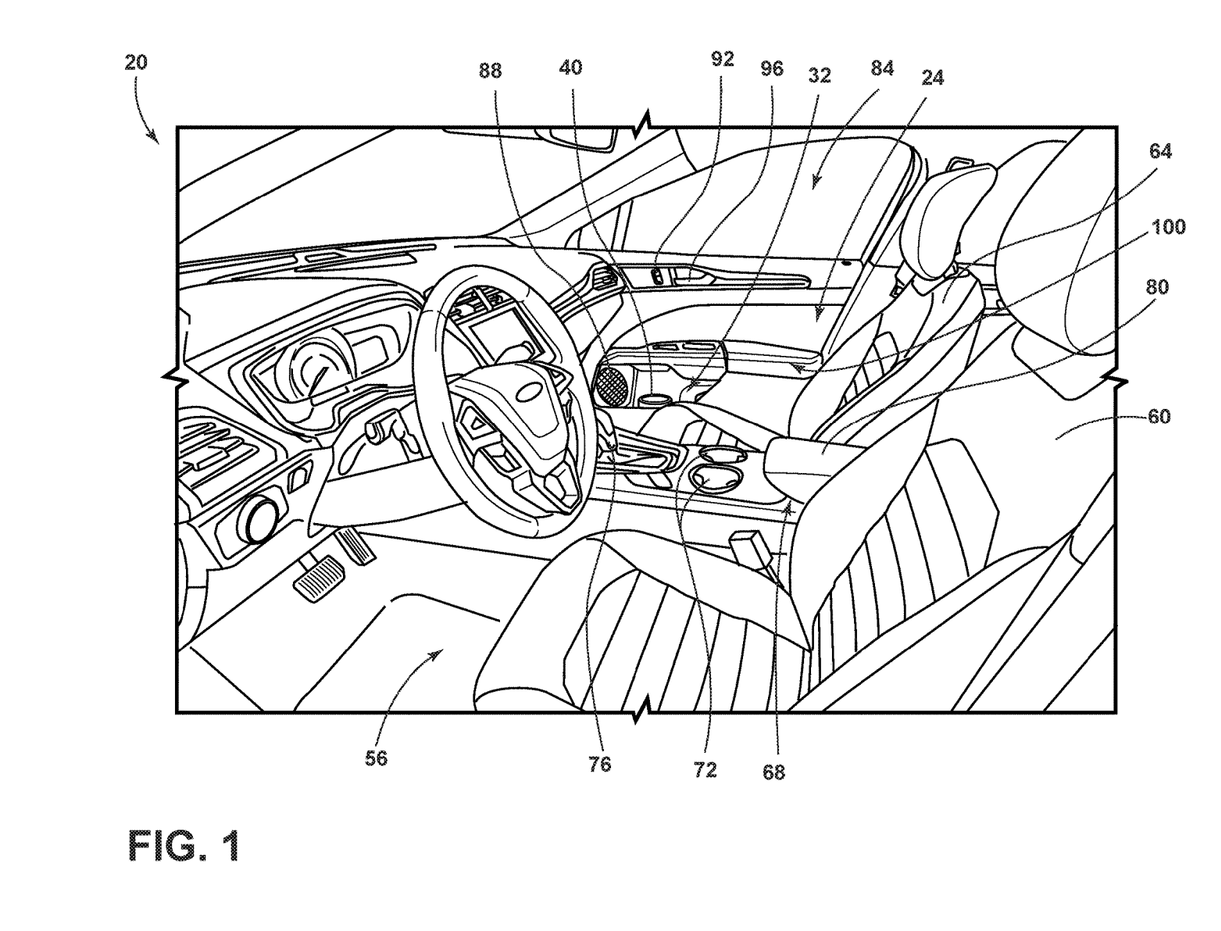
FIG. 1 is a side perspective view of an interior of a vehicle illustrating a door trim panel and container holder.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a trim panel. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Figure 5:
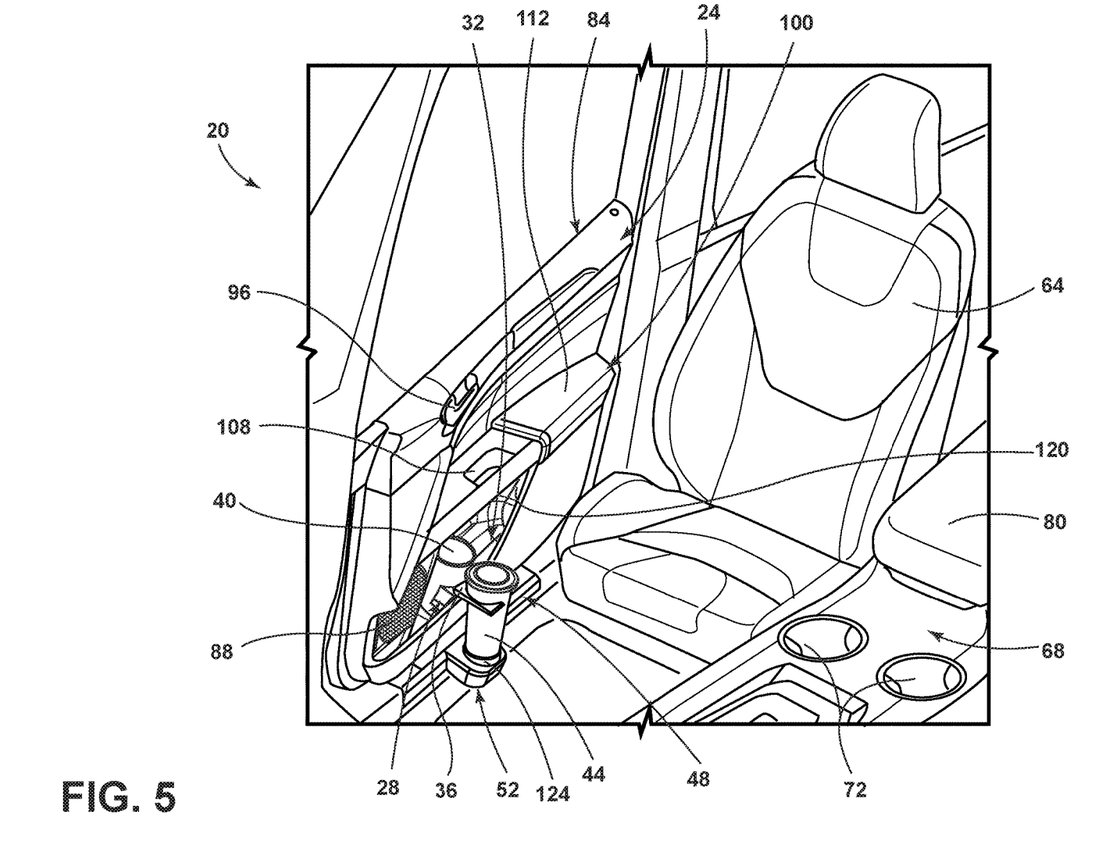
FIG. 5 is an aerial perspective view of the trim panel installed proximal a passenger seat illustrating a second container retained by a rotating bezel and a container receptacle, according to another embodiment.
Figure 6:
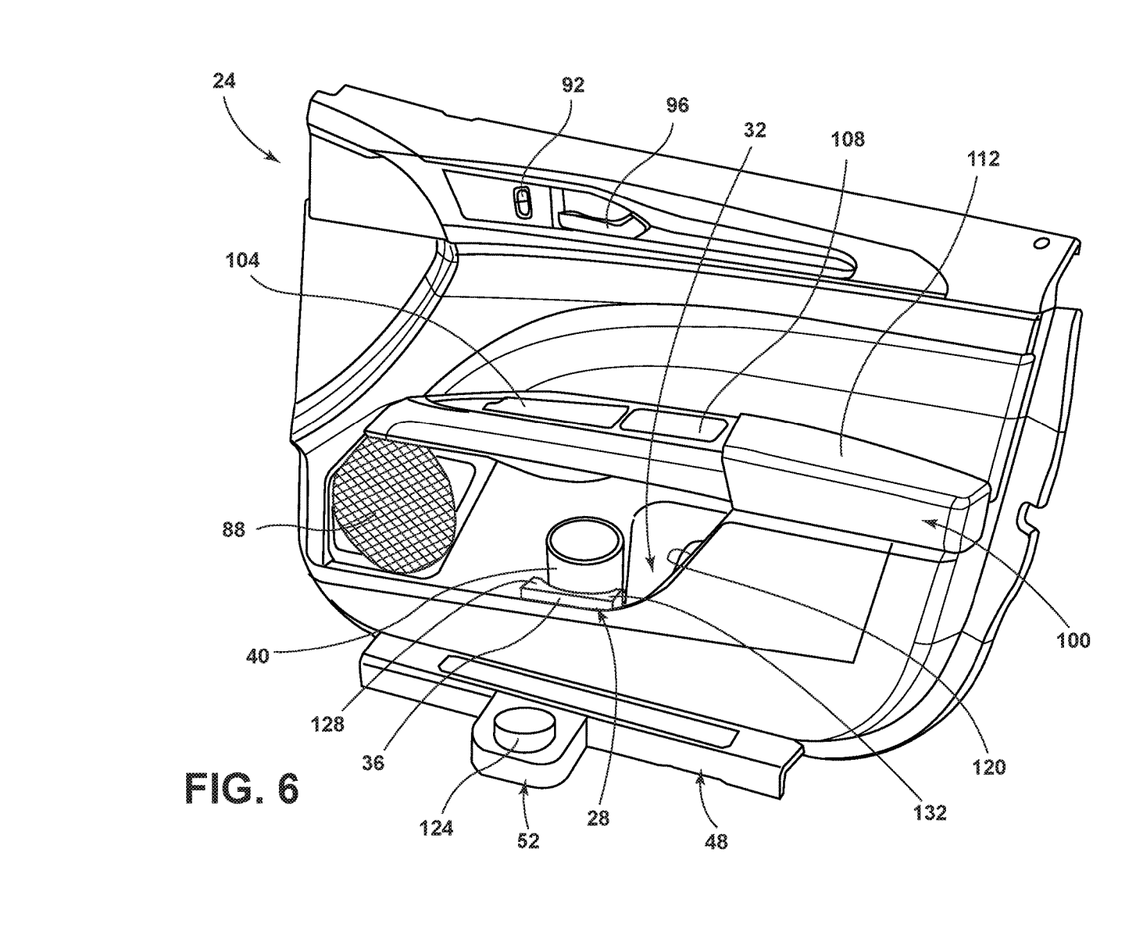
FIG. 6 is a side perspective view of the trim panel illustrating the first container in the container holder and the rotating bezel in a stowed position.
Figure 7:
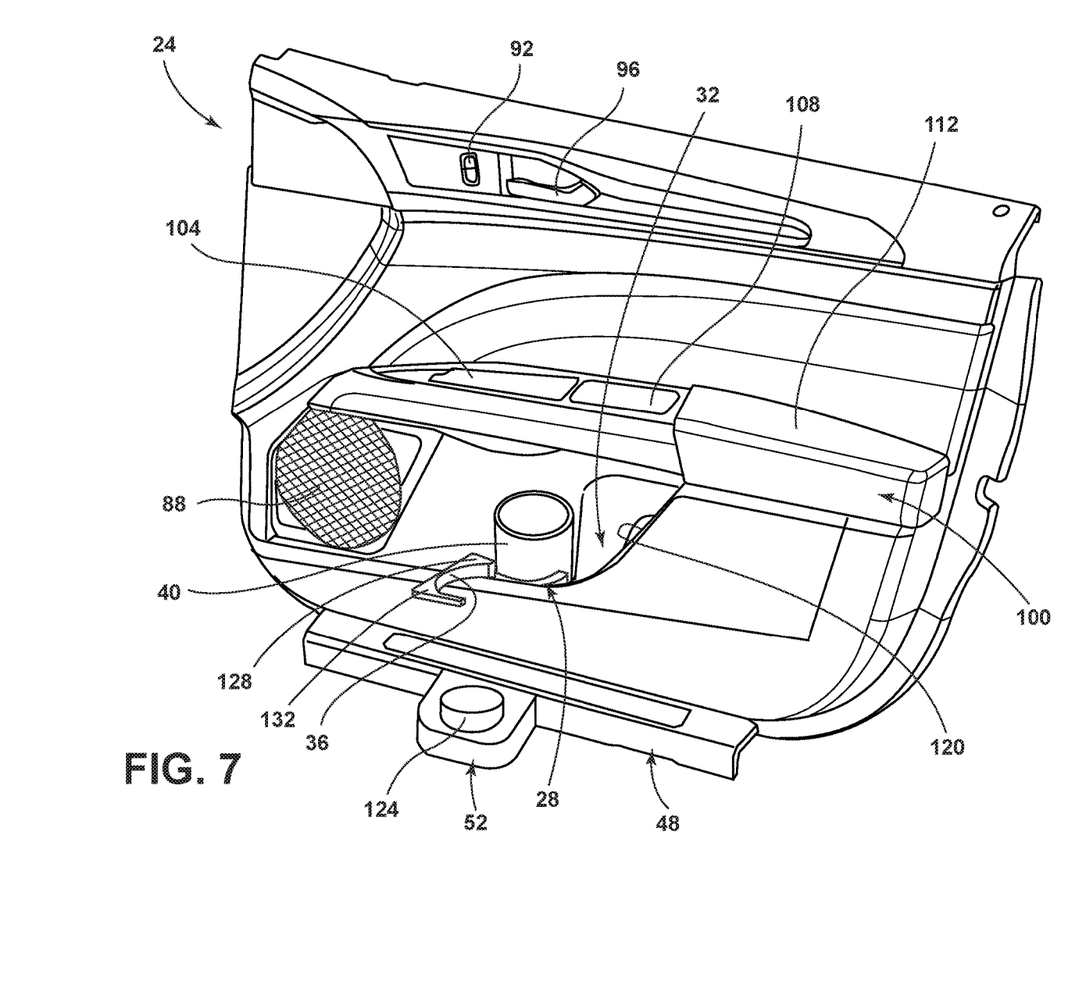
FIG. 7 is a side perspective view of the trim panel illustrating the first container in the container holder and the rotating bezel in a deployed position.

Referring to FIGS. 1-9, reference numeral 20 generally designates a vehicle. The vehicle 20 may be a wheeled motor vehicle, according to one embodiment. The vehicle 20 may include a trim panel 24. The trim panel 24 may include a container holder 28 that is operably coupled to a storage area 32. The container holder 28 includes a rotating bezel 36. The container holder 28 is configured to hold a single container, such as a first container 40, when the rotating bezel 36 is in a stowed position (FIG. 6) and a plurality of containers, such as the first container 40 and a second container 44, when the rotating bezel 36 is in a deployed position (FIG. 7). The vehicle 20 and/or the trim panel 24 may further include a scuff plate 48 that is positioned below the trim panel 24 and includes a container receptacle 52.

Referring again to FIG. 1, an interior 56 of the vehicle 20 is shown including a driver seat 60 and a passenger seat 64 positioned on either side of a center console 68. The center console 68 may include various functionalities such as, one or more cup holders 72, a gear shifting mechanism 76, and a storage bin 80. The vehicle 20 has one or more doors 84 positioned proximate the driver and passenger seats 60, 64. The door 84 of the vehicle 20 includes various features and functionalities, such as a speaker 88, a door locking mechanism 92, a door handle 96, an armrest 100, and the storage area 32.

Figure 2:
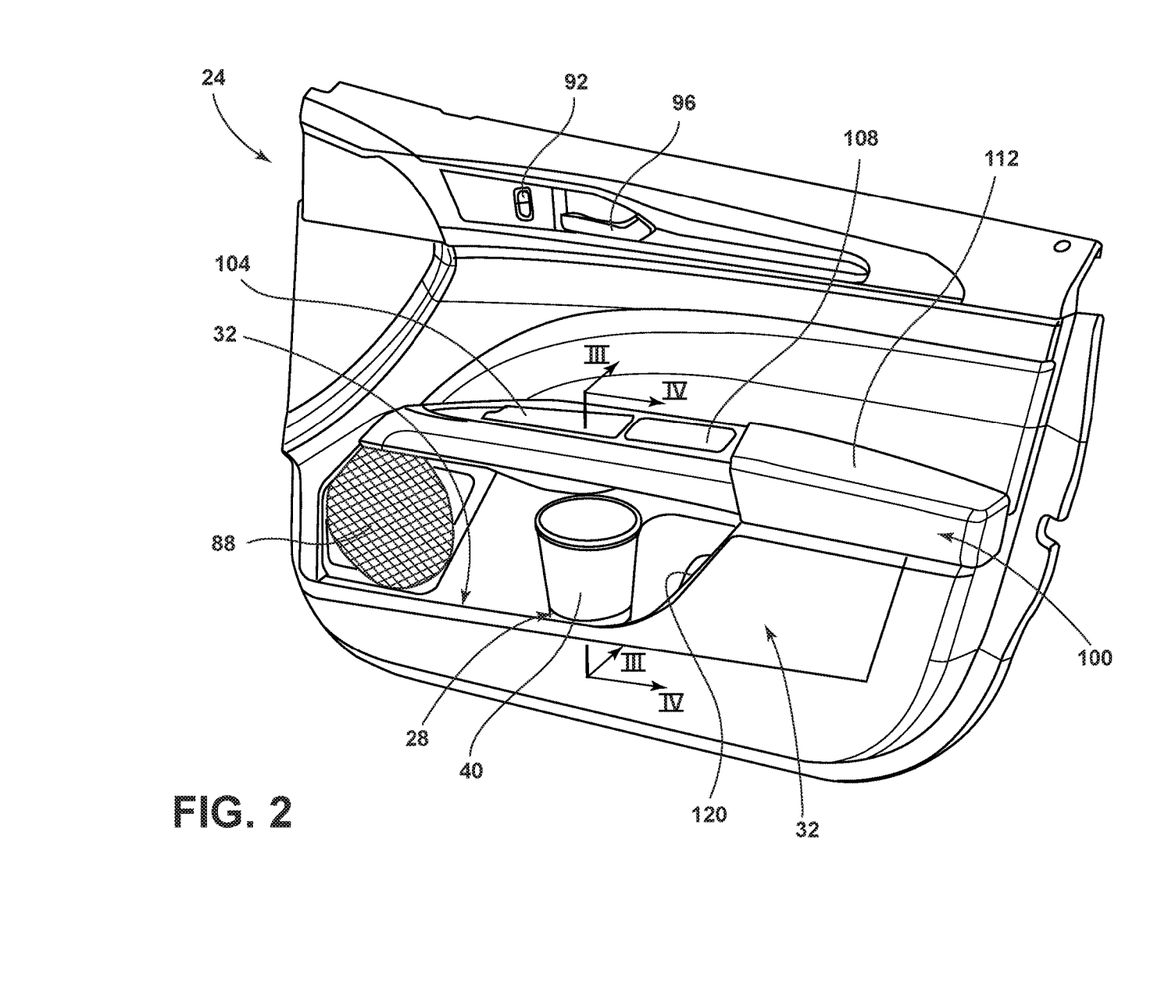
FIG. 2 is an enlarged side perspective view of the door trim panel and container holder, according to one embodiment, illustrating a container holder.

Referring now to FIG. 2, the various features and functionalities provided in the door 84 may be incorporated in the trim panel 24 to present a user of the vehicle 20 with an aesthetically pleasing yet functional package. The speaker 88 is shown positioned in a forward lower quadrant of the trim panel 24. The door locking mechanism 92 and the door handle 96 are positioned near one another and towards an upper end of the trim panel 24. The armrest 100 may include a supplemental storage area 104, a door-closing handle 108 and an arm-resting portion 112. The storage area 32 in the trim panel 24 is shown positioned below the armrest 100 and rearward of the speaker 88. The storage area 32 may be commonly referred to as a map pocket. Conventional trim panels 24 may be equipped with the container holder 28 to retain the first container 40 within the designated area of the trim panel 24. However, conventional trim panels 24 that are equipped with the container holder 28 often result in the storage area 32 being split to allow for the integration of the container holder 28. Additionally, conventional trim panels 24 that are equipped with the container holder 28 may position the first container 40 in such a manner that access to the storage area 32 is impeded by the first container 40. A recessed portion 120 of the storage area 32 becomes particularly difficult to access by the user when the first container 40 is a large container stowed in the container holder 28. Further, conventional trim panels 24 that are equipped with the container holder 28 typically have a limited vertical distance between the container holder 28 and the armrest 100 that limits a height of the first container 40 that will fit within the designated area of the trim panel 24.

Figure 3:
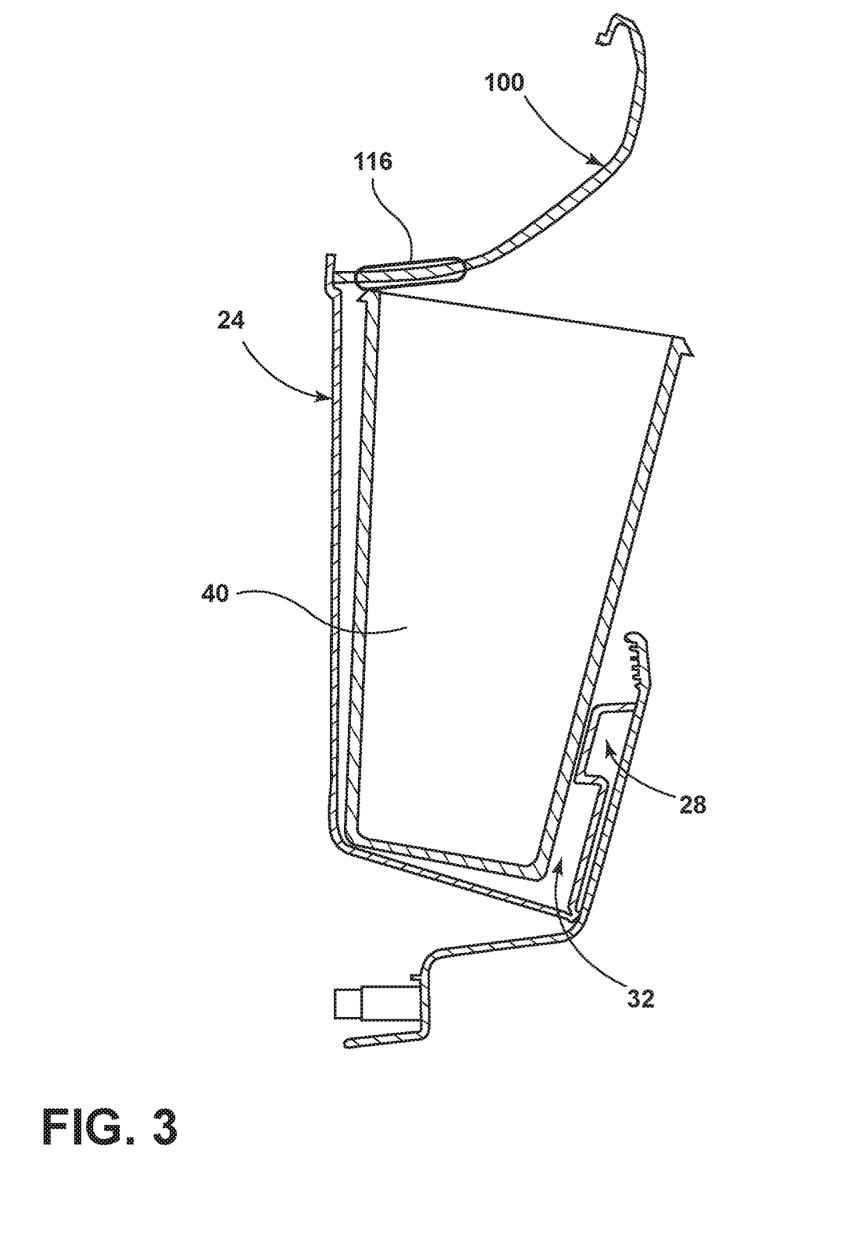
FIG. 3 is a cross-sectional view of the trim panel taken along line of FIG. 2, according to one embodiment, illustrating a first container in the container holder.
Figure 4:
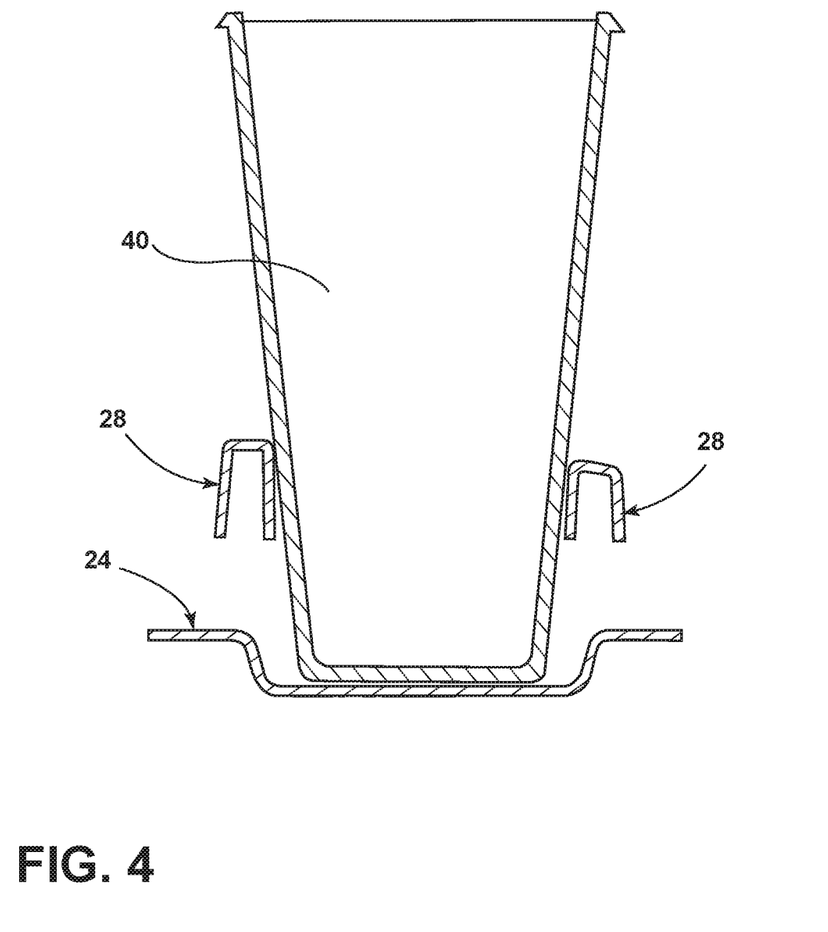
FIG. 4 is a cross-sectional view of the trim panel taken along line IV-IV of FIG. 2, according to one embodiment, illustrating the first container in the container holder.

Referring to FIGS. 3 and 4, the conventional trim panel 24 is shown from various cross-sectional views in the area around the container holder 28 and the storage area 32. The container holder 28 is integrated into the trim panel 24 in such a way that the first container 40 is retained in the container holder 28 that is located within the storage area 32 and below the armrest 100. The first container 40, as depicted, is a large container that is difficult or impossible to remove from the container holder 28 without deforming the first container 40. An attempt to remove the first container 40 from the container holder 28 may result in physical contact between the first container 40 and the armrest 100 at one or more positions along the armrest 100, which may be referred to as armrest-interference points 116. Accordingly, the height of the first container 40 is limited to a dimension that is less than the distance between a bottom of the container holder 28 and the armrest 100. The height of the first container 40, as depicted, is about equal to the distance between the bottom of the container holder 28 and the armrest 100. Additionally, the presence of the first container 40 in the container holder 28 of the trim panel 24 may at least partially impedes the available and/or accessible storage space in the storage area 32. The impediment presented by the first container 40 includes, but is not limited to, limiting a length of an item that a user wishes to store in the storage area 32 and additionally makes accessing the storage area 32 more difficult to the user.

Referring now to FIG. 5, the trim panel 24 is shown operably coupled to the door 84 of the vehicle 20. The trim panel 24 includes walls configured to form the storage area 32. The storage area 32 further includes the container holder 28 and the recessed portion 120. In the depicted embodiment, the container holder 28 includes the rotating bezel 36. The container holder 28 is also configured to hold a single container, such as the first container 40, when the rotating bezel 36 is in a stowed position. The container holder 28 is configured to hold a plurality of containers, such as the first container 40 and the second container 44, when the rotating bezel 36 is in a deployed position. The rotating bezel 36 is shown in FIG. 5 in the deployed position and retaining the second container 44. The scuff plate 48 is positioned below the trim panel 24. The scuff plate 48 includes the container receptacle 52 that aids in retention of the second container 44. When the rotating bezel 36 is in the deployed position, the rotating bezel 36 may be positioned directly above a wall 124 of the container receptacle 52 in the scuff plate 48. The rotating bezel 36 rotates about a fixed axis in a horizontal direction as the rotating bezel 36 is transitioned between the stowed position and the deployed position. The rotating bezel 36 may be semi-circular in shape and/or generally C-shaped. When the rotating bezel 36 is in the deployed position, the rotating bezel 36 and the container receptacle 52 in the scuff plate 48 may be used to retain larger containers than the containers that would be otherwise capable of vertical storage in the container holder 28. In other words, the second container 44 may be larger than the first container 40 and the second container 44 may have a height that would have prevented the second container 44 from being vertically stored in the container holder 28. By providing the additional or alternative storage option for the containers 40, 44 with the rotating bezel 36 and the container receptacle 52, the user may store larger items in the storage area 32 and may be provided with easier access to the recessed portion 120. While the trim panel 24, container holder 28, storage area 32, rotating bezel 36, scuff plate 48, and the container receptacle 52 are shown as proximal to the passenger seat 64, it is contemplated that the trim panel 24, container holder 28, storage area 32, rotating bezel 36, scuff plate 48, and/or container receptacle 52 may be alternatively or additionally positioned within the vehicle 20. For example, the trim panel 24, container holder 28, storage area 32, rotating bezel 36, scuff plate 48, and/or container receptacle 52 may be positioned proximal the driver seat 60 or any other suitable location within the vehicle 20. Additionally, the concepts disclosed herein may be used in environments or settings that are not within the vehicle 20, which may include, but is not limited to, movie theaters, sports arenas, and so on.

Referring to FIGS. 6 and 7, the trim panel 24 is shown with the rotating bezel 36 in the stowed position (FIG. 6) and the deployed position (FIG. 7). The first container 40 is retained in the container holder 28 of the storage area 32. When the rotating bezel 36 is in the stowed position and the first container 40 is within the container holder 28, the rotating bezel 36 provides additional lateral support to the first container 40 in a vertical direction. Said another way, the rotating bezel 36 vertically extends the container holder 28 when the rotating bezel 36 is in the stowed position. The rotating bezel 36 rotates in a lateral or horizontal direction as the rotating bezel 36 is transitioned between the stowed position and the deployed position. When the rotating bezel 36 is in the deployed position, the rotating bezel 36 may be positioned directly above the wall 124 of the container receptacle 52 in the scuff plate 48. The fixed axis of rotation for the rotating bezel 36 to be transitioned between the stowed position and the deployed position is located at a first end 128 of the rotating bezel 36. Accordingly, the rotating bezel 36 may be transitioned between the stowed position and the deployed position independent of whether the first container 40 is positioned in the container holder 28 of the storage area 32.

Referring again to FIGS. 6 and 7, while the rotating bezel 36 is shown as rotating about an axis located at the first end 128 of the rotating bezel 36 such that the rotating bezel 36 engages with a vehicle forward portion of the second container 44 (FIG. 8), it is contemplated that the rotating bezel 36 may rotate about an axis positioned at a second end 132 of the rotating bezel 36 such that the rotating bezel 36 engages with a vehicle rearward portion of the second container 44. However, it may be preferable for the rotating bezel 36 to engage the vehicle forward portion of the second container 44 since a driver of the vehicle 20 often has more control over sudden acceleration of the vehicle 20 than sudden braking of the vehicle 20. Accordingly, the second container 44 may be provided with support in a longitudinal direction along the vehicle 20 that opposes the inertia of the second container 44 during rapid braking of the vehicle 20.

Referring further to FIGS. 6 and 7, in some embodiments, the rotating bezel 36 may include a first rotating bezel and a second rotating bezel that further extend the container holder 28 in a vertical direction when the first rotating bezel and/or the second rotating bezel are in the stowed position. The first rotating bezel and the second rotating bezel may be operably coupled to the trim panel 24 and/or the container holder 28 at opposing ends such that the first rotating bezel rotates horizontally toward the container receptacle 52 about an axis at the first end 128 while the second rotating bezel rotates towards the container receptacle 52 about a fixed rotational axis that is positioned at the second end 132 such that the forward portion of the second container 44 is engaged by the first rotating bezel and the rearward portion of the second container 44 is engaged by the second rotating bezel to provide positive engagement to the second container 44 regardless of the direction of motion experienced by the second container 44 in response to maneuvers of the vehicle 20 (e.g., acceleration, braking, turning, etc.).

Figure 8:
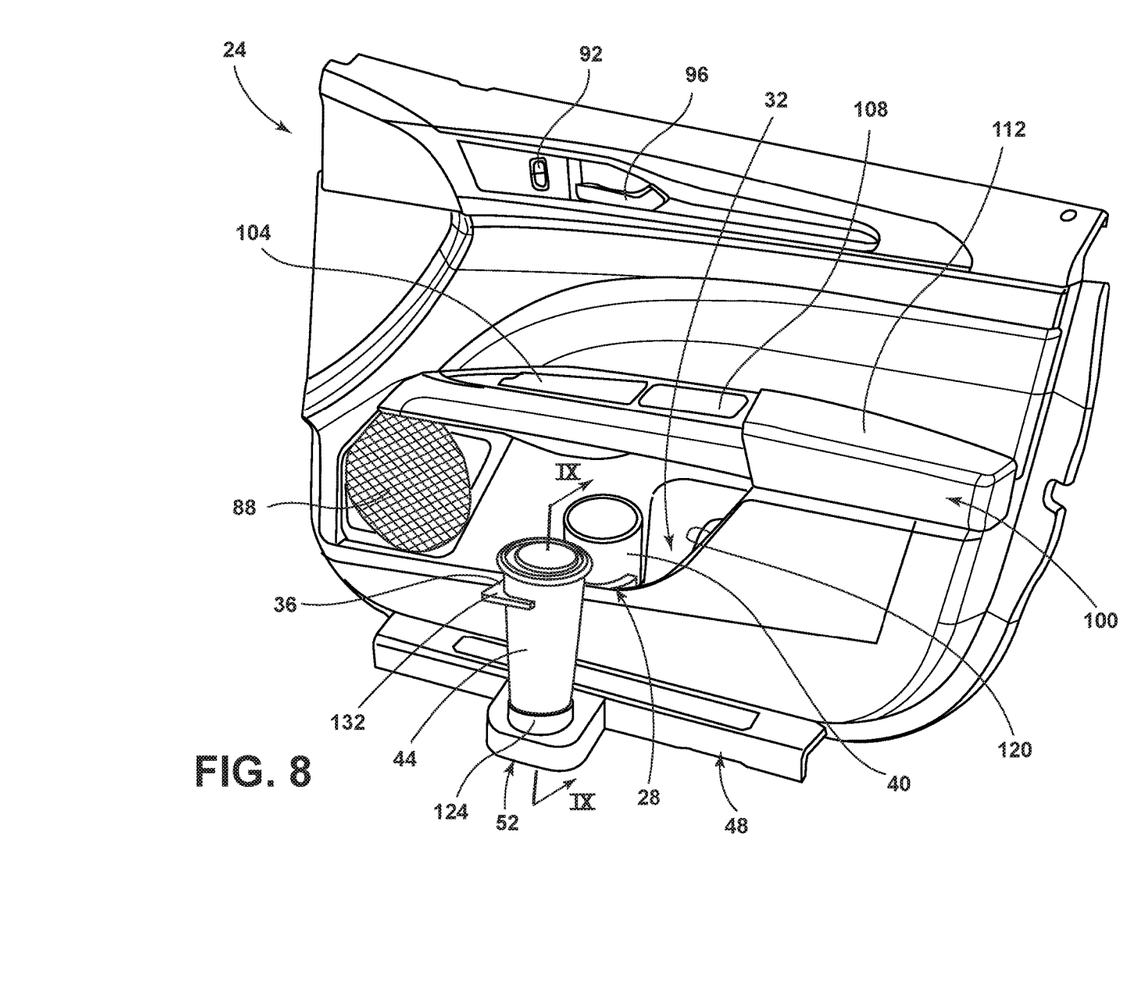
FIG. 8 is a side perspective view of the trim panel illustrating the second container retained by the rotating bezel and the container receptacle.
Figure 9:
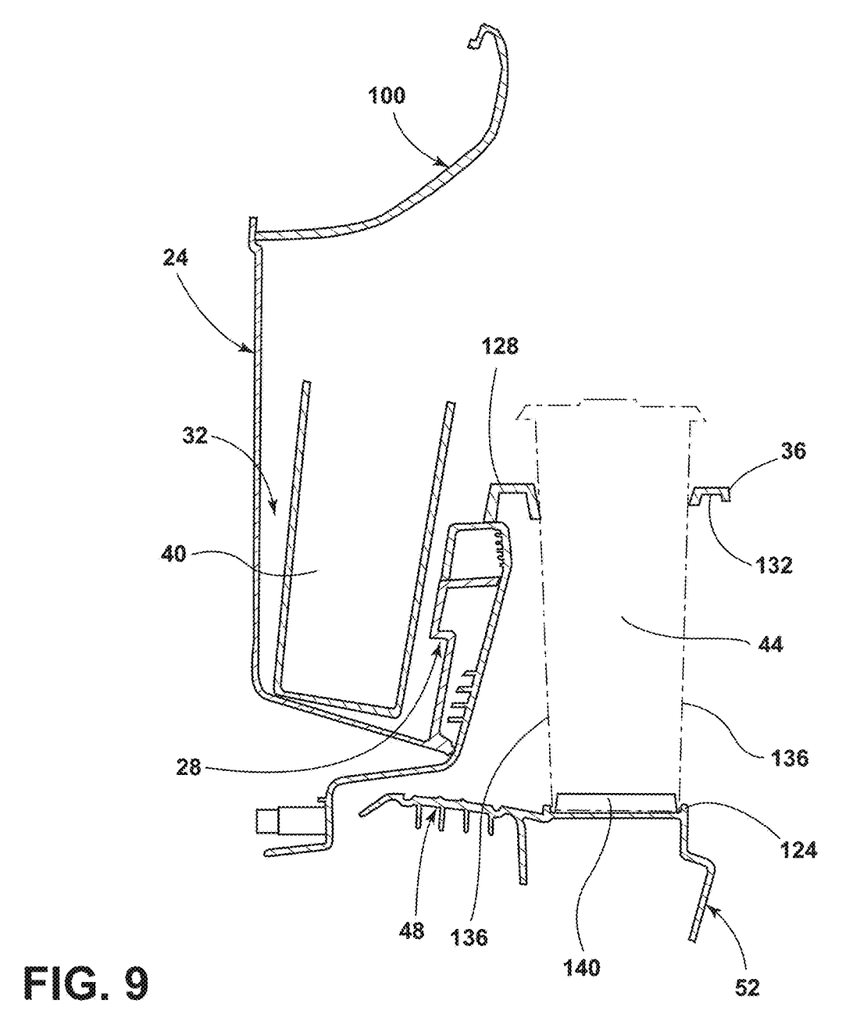
FIG. 9 is a cross-sectional view of the trim panel taken along line IX-IX of FIG. 8 illustrating the first container in the container holder and the second container retained by the rotating bezel and container receptacle.

Referring now to FIGS. 8 and 9, the trim panel 24 is shown with the rotating bezel 36 in the deployed position. The first container 40 is retained by the container holder 28 in the storage area 32. The second container 44 is retained by the rotating bezel 36 and the container receptacle 52 in the scuff plate 48. The wall 124 of the container receptacle 52 provides additional and uninterrupted support to an outer edge 136 of the second container 44. The continuous support provided by the wall 124 to the outer edge 136 may aid in preventing the second container 44 from becoming dislodged from the rotating bezel 36 and the container receptacle 52 as the vehicle 20 accelerates, brakes, turns, and generally performs vehicle maneuvers. The container receptacle 52 may further include a raised central portion 140 that is configured to support a recessed portion in the underside of the second container 44 that typically exists in travel containers (e.g., soft drink containers). Greater access to the recessed portion 120 of the storage area 32 is provided to the user as can be seen by the increased amount of space between the armrest 100 and an upper portion of the first container 40. Additionally, the second container 44 may be of a substantially greater height than the first container 40 as can be seen with the available clearance between the armrest 100 and the upper portion of the second container 44. Further, the rotating bezel 36 and the container receptacle 52 in the scuff plate 48 may be sufficiently laterally displaced from the armrest 100 of the trim panel 24 that the limiting factor in the vertical height of the second container 44 becomes a roof of the vehicle 20 rather than the armrest 100 or other components of the trim panel 24.

Container holders 28 are often provided at various locations within the vehicle 20. Some vehicles 20 provide the container holder 28 in the trim panel 24 of the vehicle 20. However, the container holders 28 typically provided in the trim panel 24 of the vehicle 20 often impede access to additional functionality of the trim panel 24, such as the storage area 32. Further, large containers, such as the second container 44 typically cannot be stored vertically in the container holder 28 and must be placed horizontally in the storage area 32, which thereby obstructs use of the storage area 32. The rotating bezel 36 and the container receptacle 52 in the scuff plate 48 provide the user with the option of storing large containers such as the second container 44, in an area that is removed from the trim panel 24 such that large items may be stored in the storage area 32 and/or the user is provided with easier access to the storage area 32 and the recessed portion 120.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle, comprising:
    a trim panel, comprising:
        a storage area; and
        a container holder operably coupled to the storage area; and
    a scuff plate coupled to a floor of the vehicle and positioned below the trim panel, wherein the scuff plate comprises a container receptacle, wherein the scuff plate is separately formed from the trim panel.

2. The vehicle of claim 1, wherein the container holder further comprises:
    a rotating bezel.

3. The vehicle of claim 2, wherein the container holder is configured to hold a single beverage container when the rotating bezel is in a stowed position and a plurality of beverage containers when the rotating bezel is in a deployed position.

4. The vehicle of claim 3, wherein the deployed position of the rotating bezel positions the rotating bezel directly above a wall of the container receptacle in the scuff plate.

5. The vehicle of claim 4, wherein the rotating bezel rotates about a fixed vertical axis in a horizontal direction as the rotating bezel is transitioned between the stowed position and the deployed position.

6. A vehicle of claim 1, wherein the container receptacle in the scuff plate retains a beverage container external to the trim panel.

7. The vehicle of claim 3, wherein the plurality of beverage containers comprises a first beverage container and a second beverage container.

8. A vehicle, comprising:
    a trim panel having a container holder operably coupled to a storage area, wherein the container holder includes a rotating bezel, wherein the container holder is configured to hold a first beverage container when the rotating bezel is in a stowed position and a second beverage containers when the rotating bezel is in a deployed position, and wherein the second beverage container is retained at a location that is external to the trim panel.

9. The vehicle of claim 8, further comprising:
    a scuff plate coupled to a floor of the vehicle and positioned below the trim panel, wherein the scuff plate comprises a container receptacle, and wherein the scuff plate is separately formed from the trim panel.

10. The vehicle of claim 9, wherein the deployed position of the rotating bezel positions the rotating bezel directly above a wall of the container receptacle in the scuff plate.

11. The vehicle of claim 10, wherein the rotating bezel rotates about a fixed vertical axis in a horizontal direction as the rotating bezel is transitioned between the stowed position and the deployed position.

12. The vehicle of claim 11, wherein the rotating bezel is semi-circular in shape.

13. The vehicle of claim 9, wherein the container receptacle is configured to retain the second beverage container independent of the rotating bezel.

14. The vehicle of claim 8, wherein the trim panel is a vehicle door trim panel.

15. A vehicle, comprising:
- a container holder operably coupled to a storage area, wherein the container holder includes a rotating bezel, and wherein the container holder is configured to hold a single beverage container when the rotating bezel is in a stowed position and a plurality of beverage containers when the rotating bezel is in a deployed position; and
- a scuff plate coupled to a floor of the vehicle and positioned below the trim panel, wherein the scuff plate comprises a container receptacle, and wherein the scuff plate is separately formed from the trim panel.

16. The vehicle of claim 15, wherein the deployed position of the rotating bezel positions the rotating bezel directly above a wall of the container receptacle in the scuff plate.

17. The vehicle of claim 16, wherein the rotating bezel rotates about a fixed vertical axis in a horizontal direction as the rotating bezel is transitioned between the stowed position and the deployed position.

18. The vehicle of claim 17, wherein the rotating bezel is semi-circular in shape.

19. The vehicle of claim 15, wherein the plurality of beverage containers comprises a first beverage container and a second beverage container.

20. The vehicle of claim 15, wherein the trim panel is a vehicle door trim panel.

* * * * *